March 7, 1950 S. POSEN Re. 23,203

WEARABLE ELECTRONIC HEARING AID HAVING THE AMPLIFIER AND THE BATTERIES CONTAINED IN A COMMON CASING

Original Filed March 17, 1944 2 Sheets-Sheet 1

INVENTOR.
Sam Posen
BY
ATTY.

March 7, 1950 S. POSEN Re. 23,203

WEARABLE ELECTRONIC HEARING AID HAVING THE AMPLIFIER AND THE BATTERIES CONTAINED IN A COMMON CASING

Original Filed March 17, 1944 2 Sheets-Sheet 2

INVENTOR.
Sam Posen
BY
ATTY.

Reissued Mar. 7, 1950

Re. 23,203

UNITED STATES PATENT OFFICE 23,203

WEARABLE ELECTRONIC HEARING AID HAVING THE AMPLIFIER AND THE BATTERIES CONTAINED IN A COMMON CASING

Sam Posen, Chicago, Ill., assignor to Beltone Hearing Aid Co., Chicago, Ill., a corporation of Illinois Original No. 2,482,288, dated September 20, 1949, Serial No. 526,877, March 17, 1944. Application for reissue October 18, 1949, Serial No. 121,991

10 Claims. (Cl. 179—107)

Matter enclosed in heavy brackets [ ] appears in the original patent but forms no part of this reissue specification; matter printed in italics indicates the additions made by reissue

This invenion relates to hearing aids of the type to be worn on the body of the user.

Heretofore, wearable hearing aids have been composed of three distinct units, each to be worn on another part of the body. These three units are (1) a receiver to be placed in or close to the ear, (2) an electron tube aplifier together with a microphone arranged in a casing to be worn within the garment of the user, e. g., in a vest pocket, and (3) power supply batteries placed in another casing and to be worn within some other portion of the garment, such as in another pocket thereof. The receiver is electrically connected to the amplifier by means of a cord and likewise there is a connecting cord between the amplifier unit and the battery unit.

It is one of the main objects of this invention to combine *the microphone,* the amplifier and the batteries of a hearing aid into a single unit which is small and light enough to be carried on the body. There are known hearing aid sets having the *microphone,* the amplifier and the batteries placed in a common carrying case but these sets are of the portable or semiportable type weighing from five to ten pounds and being in size about equal to an ordinary small table radio set. A set of this kind can be carried on a handle from one place to another, e. g., from one room to another, but of course it could not be worn inconspicuously on the body of the user as is the purpose of a hearing aid of the wearable type.

It is a further object of the invention to avoid the use of the cord which heretofore has been necessary in wearable hearing aids for establishing a connection between the batteries and the amplifier. By dispensing with this cord various inconveniences caused just by this cord are avoided. Not only is such a cord liable to break, but the rubbing of this cord against the garment of the user or against other parts of the hearing aid which is unavoidable on account of the manner such a hearing aid is worn, will manifest itself in the receiver as noises which will be the more disturbing as they are amplified by the amplifier.

It is a further object of the invention to provide a wearable hearing aid in which the batteries and the electron tube amplifier together with the microphone are so distributed within a single casing that the latter becomes small enough to be worn in a garment pocket of ordinary size.

It is a further object of the invention to provide a wearable hearing aid which can be worn conveniently in an outside pocket of the user.

*A further object of the invention is to provide a wearable electronic hearing aid having the*

*microphone, the electron tube amplifier and the batteries all inclosed in a flat casing small enough to be worn in an ordinary garment pocket, this casing being so constructed and the batteries, the electron tubes and the microphone being so arranged in the casing that the parts mentioned are accessible by the exertion of different efforts, namely; said batteries by the smallest effort, said electron tubes by a greater effort and said microphone by a still greater effort.*

The invention further contemplates to provide a wearable hearing aid with midget electron tubes having each a plug-in base which can be inserted into a socket whose axis may be arranged at any desired angle to the direction in which the axis of the tube is desired to be located.

Other objects and advantages of the invention will appear as the description proceeds, reference being had to the accompanying drawings which illustrate by way of example one embodiment of the invention, and in which.

Figure 2:
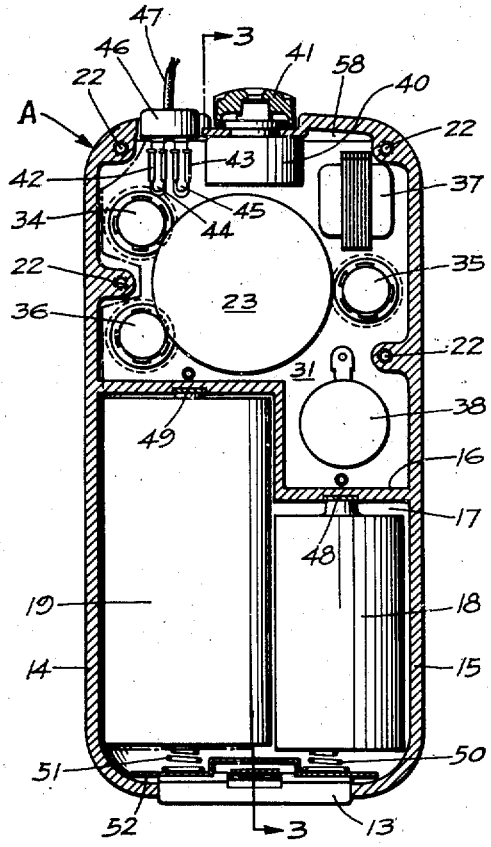
Fig. 2 is a longitudinal sectional view on the line 2—2 of Fig. 1.
Figure 3:
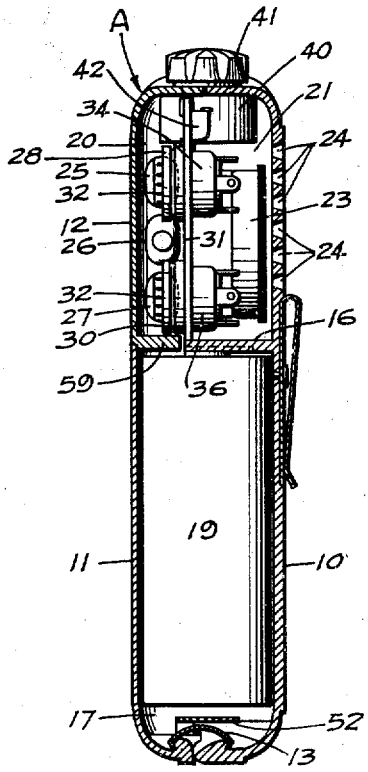
Fig. 3 is a vertical cross-sectional view on the line 3—3 of Fig. 2.
Figure 1:
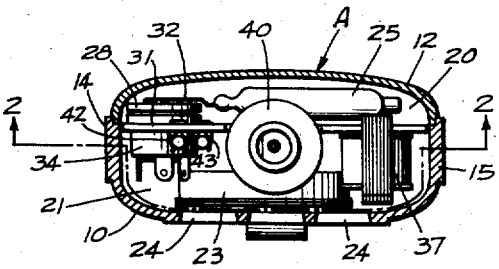
Fig. 1 is a horizontal view, partly in section, of the upper part of a wearable hearing aid according to the invention.

The hearing aid shown in the drawings comprises a casing A composed of a front cover 10, a lower back cover 11 and an upper back cover *or closure* 12. The front cover 10 and the lower back cover 11 are connected at the bottom end of the casing by means of a spring hinge 13 permitting the lower back cover 11 to be readily opened and closed. Extending across the casing between the side walls 14 and 15 of the front cover 10 and integral with this front cover is a partition wall 16 which, together with a flange 59 of the upper back cover 12, divides the casing A into a lower compartment 17 and an upper compartment 58. The partition wall 16 is so arranged and shaped that the lower compartment 17 limited thereby can accommodate two batteries 18 and 19, 18 being a filament supply A-battery, and 19 a plate supply B-battery. The compartment 58 above the partition 16 is divided lengthwise into two spaces 20 and 21 by means of a panel 31 secured to lugs of the casing A by means of screws 22 *which extend through the upper back*

*cover 12 into said lugs so that upon unscrewing of these screws 22 the back cover 12 can be removed.* A microphone 23 is mounted at one side of said panel 31 in such a manner as to extend into space 21 and to be situated behind openings 24 of the front cover 10. The microphone 23 may be of any suitable type and is preferably a crystal microphone.

The electron tube amplifier in the amplifier compartment 58 is shown as comprising three tubes 25, 26, and 27. The amplifier may follow any conventional circuit well known to those skilled in the art and may be, for instance, a resistance coupled amplifier. Since this invention is concerned with the structural arrangement of the elements of the hearing aid and not with any particular circuit in which the elements of the amplifier are arranged electrically, no wiring has been shown in the drawing. Also, only those structural elements of the amplifier are shown whose dimensions are appreciable enough to have bearing on the space requirements of the device.

Figure 4:
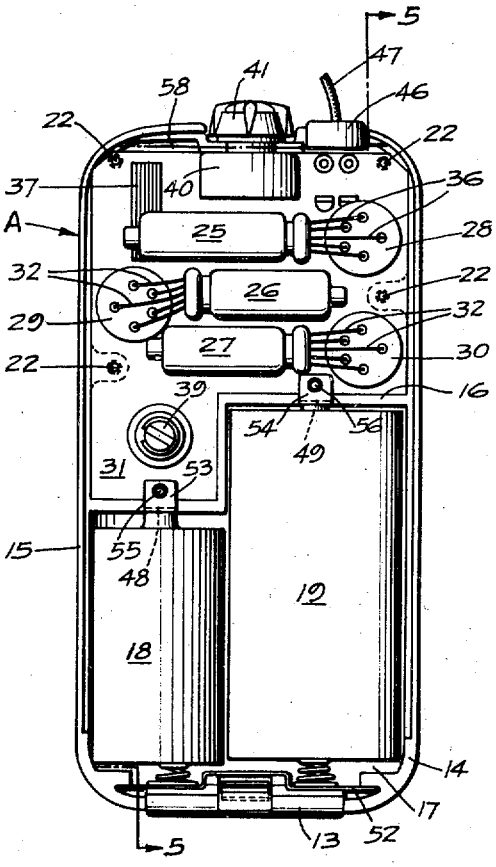
Fig. 4 is an elevational front view of the hearing aid with the front cover of the casing removed.
Figure 5:
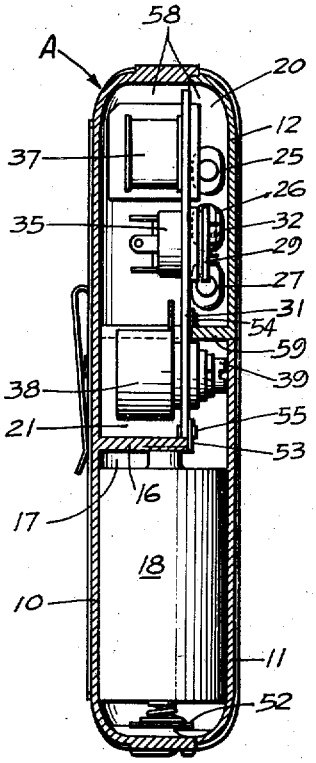
Fig. 5 is a vertical cross-sectional view on the line 5—5 of Fig. 4.
Figure 6:
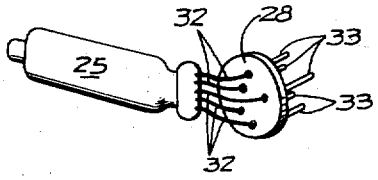
Fig. 6 is a perspective view of one of the tubes.

The electron tubes 25, 26, 27 are midget tubes and their bulbs are preferably of flat shape. Depending on what particular circuit is desired to be used, these tubes may have one or more grids. For example, all three tubes may be pentodes. Each tube 25, 26, and 27 is provided with a base 28, 29, and 30, respectively, arranged at a distance from the corresponding bulb. These bases 28, 29, 30 are flat discs, their only purpose being to hold contact pins 33 in their proper relationship to each other. The bulb of each tube is connected with the base thereof solely by the leading-in wires 32 which are secured to the pins 33 of the base and a substantial part of the length of these leading-in wires extends freely between the bulb and the base. Sockets 34, 35, and 36 mounted in the panel 31 are provided to receive the pins 33 of the bases 28, 29, 30 of the tubes 25, 26, 27. With tubes of the type just described the bulbs may be placed in any desired position with respect to the panel 31 and still be plugged in a socket permanently mounted in said panel. In the example shown, all three tubes 25, 26, 27 are arranged in a plane parallel to the panel 31, that is, in a plane which is rectangular to the direction of the axis of each of the bases 28, 29, 30. While the bulbs are all shown to extend in the horizontal direction, each of these bulbs could extend under any desired angle to the horizontal direction, or as shown in Fig. 4 for the tube 26, the bulb of any tube may be so arranged that its axis is some distance above or below the center of the corresponding base. Thereby the best possible use of the available space can be made in each particular case. It will further be seen that each tube 25, 26, or 27 may be easily exchanged without unsoldering the leading-in wires of the old tube and soldering on the leading-in wires of the new tube as has been necessary heretofore with midget tubes for wearable hearing aids, these tubes having been used without a base.

37 denotes a choke coil which is mounted to the same side of the panel 31 as the microphone 23, with a small portion of the core of this choke penetrating through an opening in the panel 31. Also at this side of the panel 31 there is arranged a tone control 38 having a shaft which extends through the panel 31 into the battery compartment 17 where it ends in a slotted head 39. When the lower back cover 11 is opened, the batteries 18, 19 as well as the head 39 of the tone control 38 lie open and the latter can be adjusted by means of a screw driver or the like so as to adapt the instrument to the needs of the person who is going to use the hearing aid. The conventional volume control in the form of a variable resistor 40 is arranged in the center of the top part of the instrument fitting into a cut-out of the panel 31 and being operable from the outside by means of a knob 41. For the connection of the amplifier with the receiver (not shown), two socket contacts 42 and 43 are provided which are secured to the panel 31 at the upper end thereof. Two contact pins 44, 45 of a plug 46 carried by the receiver cord 47 may be inserted into the socket contacts 42, 43.

The plug 46 is of small dimensions since it carries only the two contact pins 44, 45 for the receiver cord 47. No plug connection is necessary for connecting the batteries 18, 19 with the amplifier. Metal strips 48 and 49 sunk into the under surface of the partition wall 16 are in direct contact with one pole of each of the two batteries 18 and 19, the latter being forced against these strips by means of springs 50 and 51. The springs 50, 51 at the same time establish the electrical connection between the other pole of the two batteries 18, 19 and a ground plate 52. The contact strip 49 has a bent-up flange 54 which extends from the battery compartment 17 into the amplifier compartment 58 and is secured to the panel 31 by means of a stud 56 or the like. Likewise, the contact strip 48 is provided with a bent-up flange 53 fastened to the panel 31 by means of a stud or the like 55.

By arranging the microphone 23 and the various elements of the amplifier in at least two parallel planes instead of all at the same side of a panel and, in particular, by arranging the amplifier tubes opposite to the microphone, such as by placing the bulbs of the tubes 25, 26, 27 at the back side of the panel 31 behind the microphone 34, a panel of substantially smaller size can be used than is necessary if the microphone and all the elements of the amplifier are mounted on the same side of a panel. More specifically, a panel of so much smaller size can be used that in spite of the addition of the height of the batteries the total height of the combined amplifier-battery unit is not greater, or not substantially greater, than the height of the amplifier unit alone of conventional hearing aids. The thickness of the new instrument is not greater than required by the thickness of the batteries, that is to say, not greater than the thickness of the separate battery unit heretofore used. I have found that I can make my instrument with approximately the same over-all dimensions as are those of the old amplifier unit alone, and that the new instrument can be worn in one of those pockets of a garment which heretofore have been utilized to accommodate either the amplifier unit or the battery unit alone. The weight of the new instrument is substantially smaller than the sum of the weights of the amplifier unit and the battery unit heretofore used in wearable hearing aids. To give an example of the overall dimensions and the weight of instruments built according to the present invention it may be mentioned that such instruments can be easily made as small as about $5 \times 2\frac{11}{16} \times 1\frac{1}{8}$ inches, such an instrument having a total weight of approximately eight ounces.

It should be noted that while the conventional wearable instrument is commonly worn in two inside pockets of the user in order to conceal the cord connecting the battery unit with the amplifier unit, the new instrument may be worn conveniently in an outside pocket because the number of units to be placed in pockets is now reduced to a single unit and the cord which heretofore had to be concealed is eliminated altogether. It will be obvious that the microphone of the instrument is better exposed to the oncoming sounds if the instrument is placed in an outside pocket.

I desire it to be understood that while I have shown in the drawing a certain embodiment of the invention, this embodiment has been given by way of example only and that various changes, rearrangements, and modifications may be made without departing from the spirit of the invention or the scope of the appended claims.

What I claim is:

1. In a wearable hearing aid of the kind wherein a microphone, an electron tube amplifier having midget tubes and power supply batteries for said amplifier are all enclosed in a flat casing small enough to be worn in an ordinary garment pocket and wherein said microphone and said amplifier are mounted on a panel dividing lengthwise the upper portion of said casing and said batteries are housed in the lower portion of said casing, the combination of a casing having a relatively fixed front wall extending over the entire height of said casing and a back wall composed of an upper back cover and a lower back cover, said two back covers being separately openable relative to said front wall and said lower back cover being supported on a hinge so as to be readily openable without the aid of tools, with the arrangement of said microphone and some of the amplifier elements on that side of the panel which faces said front wall and of the other amplifier elements, including said tubes, on the part of said panel facing said upper back cover.

2. In a wearable hearing aid of the kind wherein a microphone, an electron tube amplifier having midget tubes and power supply batteries for said amplifier are all enclosed in a flat casing small enough to be worn in an ordinary garment pocket and wherein said microphone and said amplifier are mounted on a panel, in combination, a casing having a relatively fixed front wall extending over the entire height of said casing and a back wall composed of an upper back cover and a lower back cover, said two back covers being separately openable relative to said front wall and said lower back cover being supported on a hinge so as to be readily openable without the aid of tools, partitioning means extending from said front wall to said back wall so as to divide said casing into an upper and a lower compartment separated from one another by said partitioning means, said microphone and said amplifier being housed in the upper of said two compartments and mounted so on said panel that said microphone and some of the amplifier elements are on that side of said panel which faces said front wall and the other amplifier elements, including said tubes, on the side of said panel which faces said upper back cover, and said batteries being housed in the lower of said two compartments, said partitioning means being composed of two transverse wall portions one secured to said front wall and the other to said upper back cover, said two transverse wall portions forming together a bottom closure for said upper compartment also when said lower back cover is flung open.

3. In a wearable hearing aid of the kind wherein a microphone, an electron tube amplifier having midget tubes having leading-in wires extending from the outside into the tubes, and power supply batteries for said amplifier are all enclosed in a flat casing small enough to be worn in an ordinary garment pocket and wherein said microphone and said amplifier are mounted on a panel, in combination, a front wall and a back wall forming parts of said casing with said front wall extending over the entire height of said casing and said back wall being composed of an upper back cover and a lower back cover, said two back covers being separately openable relative to said front wall and said lower back cover being supported on a hinge so as to be readily openable without the aid of tools, partitioning means extending from said front wall to said back wall so as to divide said casing into an upper and a lower compartment separated from one another by said partitioning means, said microphone and said amplifier being housed in said upper compartment with said tubes being arranged on said panel so as to face said upper back cover, said batteries being housed in said lower compartment, and a plug-in socket for each of said midget tubes mounted in said panel with its axis perpendicular thereto to receive the leading-in wires of its coordinated tube, the end portion of each of the leading-in wires of each tube being bent down at a substantially right angle so that said tubes are pluggable into their sockets and, when so plugged in, said bent-up portions of said leading-in wires extend perpendicularly to said panel and the longitudinal axis of the bulb of each of said tubes extends parallelly to said panel and perpendicularly to the axis of its coordinated socket.

4. A wearable electronic hearing aid as claimed in claim 3, wherein said partitioning means are composed of two transverse wall portions one secured to said front wall and the other to said upper back cover, said two transverse wall portions forming together a bottom closure for said upper compartment also when said lower back cover is flung open.

*5. In a wearable hearing aid of the kind wherein a microphone, an electron tube amplifier having midget tubes and power supply batteries for said amplifier are all enclosed in a flat casing small enough to be worn in an ordinary garment pocket and wherein said microphone and said amplifier are housed in a portion of the length of said casing and said batteries are housed in the remaining portion of said casing, the combination of a casing having a relatively fixed front wall extending over the entire height of said casing and a black cover supported on a hinge so as to be readily openable relative to said front wall without the aid of tools, a closure at the back of said portion of the length of said casing which houses said microphone and said amplifier, said back cover being openable without opening said closure, said closure being held in closed position relative to said front wall by such means that to open said closure more has to be done than for gaining access to said casing portion housing said batteries, with the arrangement of said microphone and some of the amplifier elements so as to face said front wall and of the other amplifier elements, including said tubes, behind said microphone so as to face said closure.*

*6. In a wearable hearing aid of the kind wherein a microphone, an electron tube amplifier having midget tubes and power supply batteries for said amplifier are all enclosed in a flat casing small enough to be worn in an ordinary garment pocket and wherein said microphone and said*

*amplifier are housed in a portion of the length of said casing and said batteries are housed in the remaining portion of said casing, the combination of a casing having a relatively fixed front wall extending over the entire height of said casing and a back cover supported on a hinge so as to be readily openable relative to said front wall without the aid of tools, a closure at the back of said portion of the length of said casing which houses said microphone and said amplifier, said back cover being openable without opening said closure, said closure being held in closed position relative to said front wall by such means that to open said closure more has to be done than for gaining access to said casing portion housing said batteries with the arrangement of said microphone and some of the amplifier elements so as to face said front wall and of the other amplifier elements, including said tubes, behind said microphone and so as to face said closure, and with partitioning means extending from said front wall to said closure so as to form a bottom closure for said casing portion housing said amplifier also when said back cover is flung open.*

*7. In a wearable hearing aid of the kind wherein a microphone, an electron tube amplifier having midget tubes and power supply batteries for said amplifier are all enclosed in a flat casing small enough to be worn in an ordinary garment pocket and wherein said microphone and said amplifier are housed in the upper portion of said casing and said batteries are housed in the lower portion of said casing, the combination of a casing having a relatively fixed front wall extending over the entire height of said casing and a back wall composed of an upper back cover and a lower back cover, said two back covers being separately openable relative to said front wall and said lower back cover being supported on a hinge so as to be readily openable without the aid of tools, with the arrangement of said microphone and some of the amplifier elements so as to face said front wall and of the other amplifier elements, including said tubes, so as to face said upper back cover.*

*8. In a wearable hearing aid of the kind wherein a microphone, an electron tube amplifier having midget tubes and power supply batteries for said amplifier are all enclosed in a flat casing small enough to be worn in an ordinary garment pocket and wherein said microphone and said amplifier are housed in the upper portion of said casing and said batteries are housed in the lower portion of said casing, the combination of a casing having a relatively fixed front wall extending over the entire height of said casing and a back wall composed of an upper back cover and a lower back cover, said two back covers being separately openable relative to said front wall and said lower back cover being supported on a hinge so as to be readily openable without the aid of tools, with the arrangement of said microphone and some of the amplifier elements so as to face said front wall and of the other amplifier elements, including said tubes, so as to face said upper back cover, and with partitioning means extending from said front wall to said back wall so as to form a bottom closure for said upper casing portion housing said amplifier also when said back cover is flung open.*

*9. In a wearable hearing aid of the kind wherein a microphone, an electrone tube amplifier having midget tubes and power supply batteries for said amplifier are all enclosed in a flat*

*casing small enough to be worn in an ordinary garment pocket and wherein said microphone and said amplifier are housed in a portion of the length of said casing and said batteries are housed in the remaining portion of said casing, the combination of a casing having a relatively fixed front wall extending over the entire height of said casing and a back cover supported on a hinge so as to be readily openable relative to said front wall without the aid of tools, a closure at the back of said portion of the length of said casing which houses said microphone and said amplifier, said back cover being openable without opening said closure, said closure being held in closed position relative to said front wall by such means that to open said closure more has to be done than for gaining access to said casing portion housing said batteries, with the arrangement of said microphone and some of the amplifier elements so as to face said front wall and of the other amplifier elements, including said tubes, behind said microphone so as to face said closure, and a plug-in socket for each of said midget tubes arranged so that said tubes may be plugged into or out of their coordinated plug-in sockets upon said closure having been opened.*

*10. In a wearable hearing aid of the kind wherein a microphone, an electron tube amplifier having midget tubes and power supply batteries for said amplifier are all enclosed in a flat casing small enough to be worn in an ordinary garment pocket and wherein said microphone and said amplifier are housed in the upper portion of said casing and said batteries are housed in the lower portion of said casing, the combination of a casing having a relatively fixed front wall extending over the entire height of said casing and a back wall composed of an upper back cover and a lower back cover, said two back covers being separately openable relative to said front wall and said lower back cover being supported on a hinge so as to be readily openable without the aid of tools, with the arrangement of said microphone and some of the amplifier elements so as to face said front wall and of the other amplifier elements, including said tubes, so as to face said upper back cover, and a plug-in and socket for each of said midget tubes arranged so that said tubes may be plugged into or out of their coordinated plug-in sockets upon said upper back cover having been opened.*

SAM POSEN.

REFERENCES CITED

The following references are of record in the file of this patent or the original patent:

UNITED STATES PATENTS

| Number | Name | Date |
|---|---|---|
| 352,084 | Drescher | Nov. 2, 1886 |
| 1,578,646 | Craft | Mar. 30, 1926 |
| 1,630,028 | Reynolds | Mar. 24, 1927 |
| 1,688,976 | Lum | Oct. 23, 1928 |
| 2,017,358 | Taylor | Oct. 15, 1935 |
| 2,148,233 | Carlson | Feb. 21, 1939 |
| 2,182,865 | Franzblau | Dec. 12, 1939 |
| 2,192,669 | Wengel | Mar. 5, 1940 |
| 2,308,550 | Shapiro | Jan. 19, 1943 |
| 2,327,137 | Shapiro | Aug. 17, 1943 |
| 2,327,320 | Shapiro | Aug. 17, 1943 |
| 2,333,028 | Merrill | Oct. 26, 1943 |
| 2,424,422 | Tresise et al. | July 22, 1947 |
| 2,431,198 | Posen | Nov. 18, 1947 |
| 2,444,302 | Lybarger | June 29, 1948 |